June 11, 1957  S. R. JORDAN  2,795,749
ADJUSTABLE SPEED ALTERNATING CURRENT MOTOR
Filed June 23, 1955

INVENTOR.
STANLEY R. JORDAN
BY
HIS ATTORNEYS

United States Patent Office 2,795,749
Patented June 11, 1957

2,795,749
ADJUSTABLE SPEED ALTERNATING CURRENT MOTOR

Stanley R. Jordan, Dayton, Ohio, assignor to Standard Electrical Products Company, Dayton, Ohio, a corporation of Ohio Application June 23, 1955, Serial No. 517,579

4 Claims. (Cl. 318—28)

This invention relates to an adjustable speed alternating current motor. The invention relates more particularly to an adjustable speed alternating current commutator motor provided with a separately connected field winding or shunt-connected field winding. However, this invention is not so limited in that other types of alternating current motors may be made and operated according to this invention.

Due to the fact that distribution of electric power is generally by means of alternating current energy, it is highly desirable that alternating current motors be available, which alternating current motors are provided with means for adjusting the rotational speed thereof.

In the past, the conventional method of speed control of alternating current motors has been by means of changing the frequency applied to the alternating current motor. However, this means of changing the speed of an alternating current motor is rather expensive due to the fact that additional rotating or electronic apparatus is required to provide change of frequency.

Hence, an object of this invention is to provide a reversible alternating current motor with speed and/or load characteristics similar to those characteristics of a direct current shunt-wound motor.

Another object of this invention is to provide circuit means whereby a single phase alternating current motor may be connected to two phases of a three-phase power supply for speed control operation thereof.

Another object of this invention is to provide a means of speed control of an alternating current motor, which means of control includes an adjustable voltage transformer.

Another object of this invention is to provide a means of controlling rotational direction and speed of an alternating current motor, which means of control includes a magnetic amplifier system.

A further object of this invention is to provide a means of controlling rotational direction and speed of an alternating current motor, which means of control includes the use of electronic tubes.

Other objects and advantages reside in the construction of parts, the combination thereof and the mode of operation, as will become more apparent from the following description.

Figure 1:
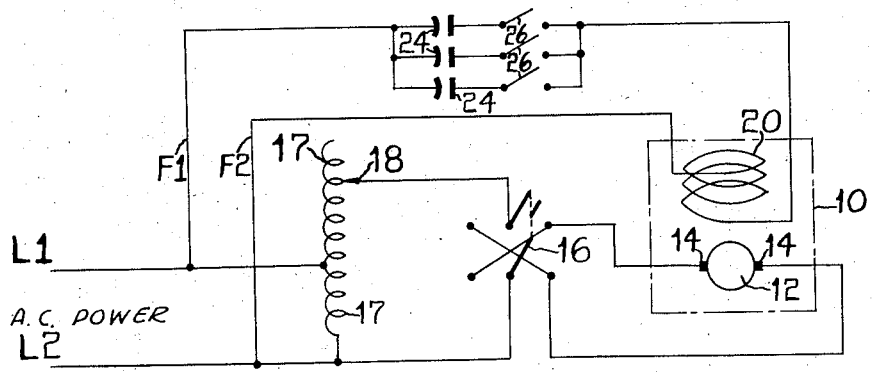
Figure 1 is a schematic diagram showing a reversible adjustable speed alternating current motor of the shunt wound commutator type having speed and load characteristics similar to the characteristics of a direct current shunt wound motor.

Referring to the drawing in detail, Figure 1 shows an adjustable speed alternating current motor 10 of this invention comprising an armature or rotor 12 of the commutator type provided with a pair of brushes 14. The armature or rotor 12 is connected to a conventional double-throw, double-pole reversing switch 16. The reversing switch 16 is also connected to an adjustable voltage transformer 17 provided with an adjustment tap 18. The adjustable voltage transformer 17 is connected to a single-phase alternating current power supply provided with lines L1 and L2.

Also connected across the power supply lines L1 and L2 in advance of the adjustable voltage transformer 17 are field supply lines F1 and F2 which connect to a field winding 20 of the motor 10. The magnetic poles upon which the field winding 20 is wound are preferably made of laminated steel in order to reduce losses due to eddy currents and other factors resulting from alternating current energy.

It is well known that the inductive reactance of a field winding such as field winding 20 causes the alternating current flowing through the field winding to lag the impressed voltage across the field winding. As a result of this lag in the phase angle of the field current, when the field winding and the armature are connected to the same source of alternating current energy, the armature voltage and the field flux are out of phase and the resultant armature torque is very small. Thus, it has been impractical to operate a shunt wound type of motor with alternating current energy.

Hence, in connection with this invention, means are provided by which the phase angle of the alternating field flux in an alternating current motor may be adjusted with respect to the phase angle of the impressed armature voltage.

In series with the F1 field line is a phase shifting network, shown herein for purposes of description as comprising a plurality of condensers or capacitors 24 which are connected in parallel relation. The group of capacitors or condensers 24 are thus in series with the field winding 20 of the motor 10. Each of the capacitors or condensers 24 is provided with a switch 26 in series therewith for connecting or disconnecting the respective capacitor 24 from parallel relation with the other capacitors. All of the condensers 24 may be of the same electrical capacitance or the condensers 24 may each have a different value of electrical capacitance. The capacitors 24 thus advance the phase angle of the field current which flows through the field winding 20, so that the field flux created by the field current of the winding 20 may be in phase with the voltage applied to the armature 12.

However, by use of the switches 26 in series with the capacitors 24, the value of capacitance in series with the field winding 20 may be adjusted; the phase angle of the field current thus may be shifted as desired so that the field flux created by the field current is in any desired phase angle relationship with respect to the voltage impressed across the armature 12. During normal operation of the motor 10, the switches 26 are initially adjusted so that a desired capacitance is placed in series with the field winding 20 and the capacitance value in series with the field winding 20 is not changed during normal operation of the motor 10.

When it is desired to adjust the speed of the motor 10, the adjustment tap 18 of the adjustable voltage transformer 17 is changed so that the voltage applied across the armature 12 is changed. With reduced armature voltage, the speed of the motor 10 is decreased; with increased armature voltage, the speed of the motor 10 is increased. It is also to be understood that means such as a transformer or resistor or the like may be connected in the field circuit for adjusting the magnitude of the current through the field winding 20 to widen the range of speed control.

For reversal of the direction of rotation of the armature 12, the switch 16 is reversed in a conventional manner. However, it is to be understood that a reversing switch may be connected in the field circuit rather than the armature circuit of the motor 10 for reversal of rotation thereof.

Figure 2:
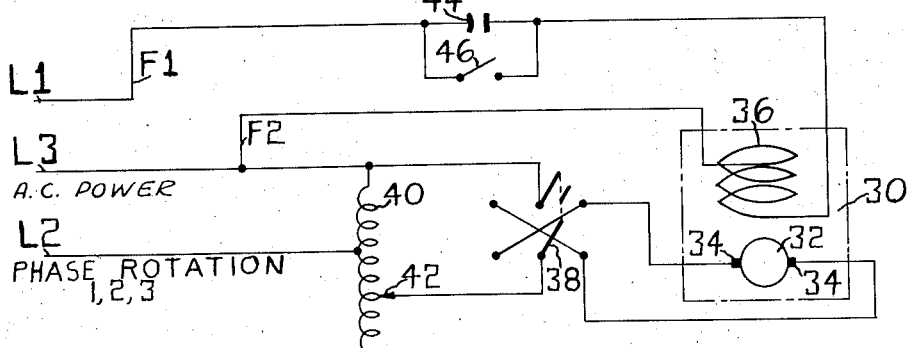
Figure 2 shows connection of a single phase alternating current motor of this invention to two phases of a three-phase alternating current power supply.

In Figure 2 an alternating current motor 30 provided with a commutator type of armature 32 and brushes 34 is diagrammatically shown. The motor 30 is also provided with a field winding 36. The magnetic poles upon which the field winding 36 is wound are preferably laminated, as discussed with respect to the field winding 20 of Figure 1.

The motor 30 is essentially a single-phase motor; however, herein the armature 32 is provided with single-phase power from lines L2 and L3 of a three-phase power supply provided with lines L1, L3 and L2, as shown in Figure 2. The order of phase rotation is 1, 2, 3. The armature 32 is connected to a double-pole, double-throw reversing switch 38. The reversing switch 38 is connected to an adjustable voltage transformer 40 provided with an adjustment tap 42.

Connected to power supply lines L1 and L3 are field supply lines F1 and F2. The field supply lines F1 and F2 are connected to the field winding 36. A phase shifting means comprising a condenser or capacitor 44 is shown connected in the line F1 and in parallel with a switch 46. The switch 46 provides means by which the capacitance of the capacitor 44 may be inserted or removed from the field circuit. The amount of capacitance inserted into the field circuit for desired operation of the motor 30 depends upon the inductive reactance of the field winding 36. Ordinarily, little or no phase angle correction is necessary in the field circuit, as shown in Figure 2, due to the fact that the voltage 3–1 leads the voltage 3–2 by sixty degrees.

When it is desired to change the speed of the motor 30, the adjustment tap 42 of the adjustable voltage transformer 40 is changed, thus increasing or decreasing the voltage applied to the armature 32. The reversing switch 38 is used to reverse the direction of rotation of the armature 32.

Figure 3:
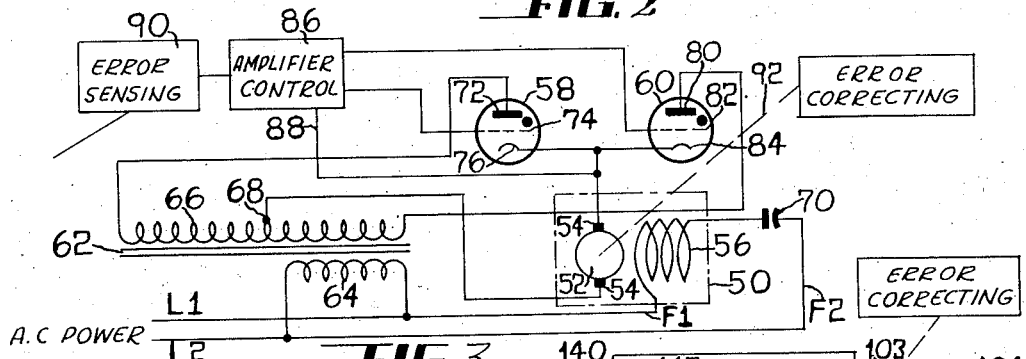
Figure 3 is a schematic diagram showing an adjustable speed alternating current motor of this invention and electronic tube control means therefor for operating the motor as an automatic error correcting device.

Figure 3 shows an alternating current motor 50 provided with an armature 52, of the commutator type. The commutator of the armature 52 has brushes 54 in engagement therewith. The motor 50 has a field winding 56 which is preferably wound upon laminated pole pieces. A pair of electronic tubes 58 and 60, which may be of the thyratron type, are used to control the current supplied to the armature 52 of the motor 50. Power is supplied to the armature 52 and the field 56 by means of an alternating current single phase power supply provided with lines L1 and L2.

Lines L1 and L2 connect to a transformer 62 provided with a primary winding 64 and a secondary winding 66. The secondary winding 66 is provided with a midtap 68. Also connected across lines L1 and L2 of the power supply are field supply lines F1 and F2 which connect to the field winding 56. In series with the line F2 is a phase shifting means comprising a capacitor 70 which is used to advance the phase angle of the current flowing through the field winding 56.

The electronic tube 58 is provided with a plate 72, a grid 74, and a cathode 76. The tube 60 is provided with a plate 80, a grid 82, and a cathode 84. The plate 72 of the tube 58 is connected to one end of the secondary winding 66 of the transformer 62. The plate 80 of the tube 60 is connected to the other end of the secondary winding 66. The cathodes 76 and 84 of the tubes 58 and 60, respectively, are connected to one brush 54 of the armature 52. The other brush 54 of the armature 52 is connected to the center tap 68 of the transformer 62.

An amplifier control unit 86 has a control line 88 which connects to the cathodes 76 and 84 of the tubes 58 and 60. The grids 74 and 82 of the tubes 58 and 60, respectively are connected to the amplifier control unit 86. Operation of the amplifier control unit 86 may be governed manually or in any other suitable manner. However, herein, operation of the amplifier control unit 86 is shown as being governed by an error sensing mechanism 90 which may be connected to any suitable source so that the motor 50 acts as an automatic error correcting device through a shaft 92 thereof, shown diagrammatically in Figure 3.

The motor 50 is reversible due to the fact that current reaching the armature 52 may flow through either the tube 58 or the tube 60 as voltage applied to the grids 74 and 82 of the tubes 58 and 60, respectively, is controlled by the amplifier control unit 86. Furthermore, the amount of current flow through either of the tubes 58 and 60 may be controlled by means of the amplifier control unit 86 so that the rotational speed of the motor 50 may be controlled as well as the direction of rotation thereof. When it is desired to rotate the motor 50 in one direction, current is caused to flow through the tube 58. When it is desired to cause rotation of the motor 50 in the opposite direction, control of the grid 82 causes current to flow in the tube 60. The potential upon the grid 74 is adjusted so that no current flows through the tube 58 while the tube 60 is conducting current.

Thus the circuit and mechanism shown in Figure 3 may be used as an automatic error sensing and error correcting mechanism in which the alternating current motor 50 is used as actuator means.

Figure 4:
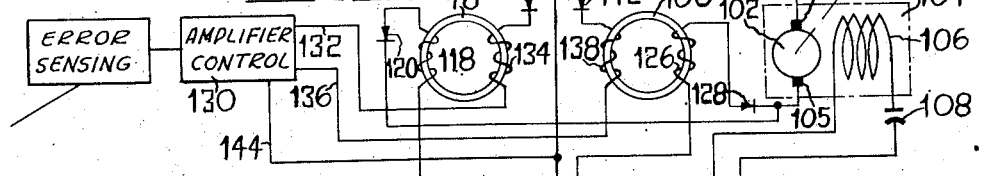
Figure 4 is a schematic diagram showing an adjustable speed alternating current motor of this invention with magnetic amplifier control means therefor.

In Figure 4 is shown a schematic wiring diagram similar to that of Figure 3 in which the system is used as an automatic error sensing and error correcting mechanism. In the circuit shown in Figure 4, a magnetic amplifier circuit is shown in which saturable reactors 98 and 100 are connected to control the flow of current through an armature 102 of a motor 104. The armature 102 is of the commutator type having brushes 103 and 105. The motor 104 is provided with a field winding 106. The field winding 106 is connected to a source of alternating current energy through field lines F1 and F2. Connected in the field line F2 is a phase shifting means comprising a capacitor 108 which serves to advance the phase angle of the current flowing through the field winding 106.

A transformer 110 has a primary winding 112 thereof connected directly across the alternating current power supply. The transformer 110 has a secondary winding 114 provided with an end 116 connected to a power winding 118 of the saturable reactor 98. In series with the power winding 118 is a rectifier 120 which connects to the brush 105 of the armature 102 of the motor 104. An opposite end 124 of the transformer 116 is connected to a power winding 126 of the saturable reactor 100. In series with the power winding 126 is a rectifier 128 which connects to the brush 105 of the armature 102 of the motor 104. Therefore, polarized current flows to the armature 102 of the motor 104 through either power winding 118 or 126 of the saturable reactors 98 and 100, respectively. Thus, direction of rotation of the armature 102 is controlled.

Current flow through the saturable reactors 98 and 100 is controlled by means of an amplifier control unit 130. The amplifier control unit 130 has a line 132 connected to a control winding 134 of the saturable reactor 98. The amplifier control unit 130 also has a line 136 connected to a control winding 138 of the saturable reactor 100. In series with the control windings 134 and 138 are rectifiers 140 and 142, respectively, which polarize the flow of current through the control windings 134 and 138. The rectifiers 140 and 142 are connected to the amplifier control unit 130 by means of a conductor lead 144. The rectifiers 140 and 142 are also connected to a midtap 146 of the secondary winding 114 of the transformer 110. The rectifiers 140 and 142 also connect to the brush 103 of the armature 102.

When it is desired to cause rotation of the armature 102 of the motor 104 in one direction, current is permitted to flow through the power winding 118 of the saturable reactor 98. Flow of current through the power winding 118 of the saturable reactor 98 is governed by means of control of current flow through the control winding 134 of the saturable reactor 98 in a conventional manner. Likewise, flow of current through the power winding 126 of the saturable reactor 100 is governed by means of control of current flow through the control winding 138 of the saturable reactor 100. The amplifier control unit 130 governs the amount of current flowing through the control windings 134 and 138 of the saturable reactors 98 and 100. The amplifier control unit 130 thus governs current flow through the armature 102 of the motor 104.

Thus, from the foregoing description and the drawings it is understood that this invention provides means by which the direction of rotation and the rotational speed of an alternating current motor may be controlled. The speed and direction of the motor may be controlled either manually or automatically.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A control system comprising an alternating current motor provided with an armature and a field winding, a pair of conductor leads for connection thereof to a single phase power supply, means in series with the field winding for advancing the phase angle of the current flowing through the field winding, the field winding and said means in series therewith being connected to said pair of conductor leads, a transformer provided with a primary and a secondary winding, the primary winding being connected across the pair of conductor leads, a pair of gas filled triode electronic tubes, the plate of one tube being connected to one end of the secondary winding of the transformer, the plate of the other tube being connected to the other end of the secondary winding of the transformer, the secondary winding of the transformer having a midtap, the midtap of the secondary winding of the transformer being connected to one side of the armature of the motor, the other side of the armature being connected to the cathodes of the tubes, control means, the control means being connected to the cathodes and grids of the tubes, the control means thus governing flow of current through the tubes and through the armature, one tube conducting current during rotation of the armature in one direction, the other tube conducting current during rotation of the armature in the other direction.

2. A regulating system comprising an alternating current motor provided with a field winding, a single phase alternating current power supply, a condenser connected in series with the field winding, conductor means connecting the condenser and field winding to the alternating current power supply, a transformer having a primary winding and a secondary winding, the primary winding of the transformer being connected across the single phase alternating current power supply, a pair of electrical saturable reactors, each of the saturable reactors having a polarized control winding circuit, each of the saturable reactors also having a power winding, the power winding of one saturable reactor being connected to one end of the secondary winding of the transformer, the power winding of the other saturable reactor being connected to the other end of the secondary winding of the transformer, the power winding of each saturable reactor also being connected in series with the armature of the motor, control means connected to the polarized windings of the saturable reactors for governing the flow of current through the polarized windings of the saturable reactors, error sensing means connected to the control means, and error correcting means attached to the armature of the motor for operation thereby.

3. A regulating system comprising an alternating current motor provided with a field winding, a single phase alternating current energy supply, a condenser connected in series with the field winding, conductor means connecting the condenser and the field winding to the alternating current energy supply, a transformer having a primary winding and a secondary winding, the primary winding of the transformer being connected across the single phase alternating current energy supply, a pair of electrical saturable reactors, each of the saturable reactors having a polarized control winding circuit, each of the saturable reactors also having a power winding, the power winding of one saturable reactor being connected to one end of the secondary winding of the transformer, the power winding of the other saturable reactor being connected to the other end of the secondary winding of the transformer, the power windings of the saturable reactors being connected in electrical parallel relation one with the other and in series with the armature of the motor, and control means connected to the polarized control windings of the saturable reactors for governing the flow of current therethrough.

4. A regulating system comprising an alternating current motor provided with a commutator type of armature and a field winding, a single phase alternating current power supply, a condenser connected in series with the field winding, conductor means connecting the condenser and field winding to the alternating current power supply, a transformer having a primary winding and a secondary winding, the primary winding of the transformer being connected across the single phase alternating current power supply, the secondary winding of the transformer having a pair of end leads and a midtap lead, the midtap lead being connected to one electrical side of the armature, amplifier means connecting the end leads of the secondary winding of the transformer to the other electrical side of the armature, control means connected to the amplifier means, error sensing means connected to the control means, and error correcting means attached to the armature of the motor for operation thereby.

References Cited in the file of this patent
UNITED STATES PATENTS

| | | |
|---|---|---|
| 455,773 | Stanley et al. | July 14, 1891 |
| 1,845,173 | Nyman | Feb. 16, 1932 |
| 2,379,867 | Conrad | July 10, 1945 |